(12) United States Patent
Lu et al.

(10) Patent No.: US 7,737,662 B2
(45) Date of Patent: Jun. 15, 2010

(54) POWER MANAGEMENT CIRCUIT FOR BATTERY PACK

(75) Inventors: Chun Lu, San Jose, CA (US); Stefan Maireanu, Sunnyvale, CA (US); Luyang Luo, Sichuan (CN); Lin Tang, Sichuan (CN); Mingzhi He, Sichuan (CN); Jianping Xu, Sichaun (CN)

(73) Assignee: O2Micro International Ltd., Georgetown (KY)

( * ) Notice: Subject to any disclaimer, the term of this patent is extended or adjusted under 35 U.S.C. 154(b) by 600 days.

(21) Appl. No.: 11/645,491

(22) Filed: Dec. 26, 2006

(65) Prior Publication Data
US 2008/0150488 A1  Jun. 26, 2008

(51) Int. Cl.
*H02J 7/00* (2006.01)
(52) U.S. Cl. .................. 320/134; 320/136; 320/150
(58) Field of Classification Search ............ 320/134, 320/135, 136, 150
See application file for complete search history.

(56) References Cited

U.S. PATENT DOCUMENTS

| | | | |
|---|---|---|---|
| 6,208,117 B1 * | 3/2001 | Hibi | 320/134 |
| 6,329,796 B1 * | 12/2001 | Popescu | 320/134 |
| 6,441,592 B1 * | 8/2002 | Rothleitner et al. | 323/267 |
| 2005/0285572 A1 * | 12/2005 | Geren et al. | 320/134 |

* cited by examiner

*Primary Examiner*—Edward Tso
*Assistant Examiner*—Samuel Berhanu
(74) *Attorney, Agent, or Firm*—Wang Law Firm, Inc.; Li K. Wang (57) ABSTRACT

A power system for managing charging, discharging and protection of rechargeable batteries is disclosed. The power system mainly includes a power system. The power system includes a switching circuit coupled to the rechargeable batteries to charge and discharge the rechargeable batteries. The power system includes a power management unit to control the switching circuit. The power system includes a temperature sensing circuit to monitor a temperature of the batteries, voltage detectors to monitor voltages of the batteries, and current detectors to monitor a current of the batteries. If an abnormal condition is sensed by the power management unit when the power system is in an operating mode, the power management unit will terminate the operating mode by switching off the switching circuit to protect the batteries and the power system.

9 Claims, 9 Drawing Sheets

POWER MANAGEMENT CIRCUIT FOR BATTERY PACK

FIELD OF THE INVENTION

The present invention relates to power supply systems and more particular to topology of power management systems.

BACKGROUND OF THE INVENTION

Rechargeable batteries are commonly employed to supply power for portable electronic devices such as radios, notebook computers, cameras, etc. A rechargeable battery can be refreshed to full capacity if the rechargeable battery is charged by a power source such as an adapter. A battery management system may be employed to implement the charging function, and the battery management system can also provide protection function to protect the battery from any damage under some abnormal conditions, such as over voltage, over temperature, etc. In conventional solutions, the charging function and protection function for a battery management system are usually implemented by separate circuits, a circuit for the charging function and a circuit for the protection function.

The battery management system usually includes a detection circuit to monitor the capacity of the rechargeable battery, for example, the voltage value of the rechargeable battery. When the battery capacity is not full, the battery management system will charge the battery. When the battery is fully charged, the charging process will be terminated.

During the process of charging the rechargeable battery, if some abnormal conditions such as over voltage, over current or abnormal temperature occur, these abnormal conditions will considerably deteriorate the battery performance. So the protection function is needed to avoid abnormal conditions from deteriorating the battery. When an abnormal condition is detected, the protection operation, such as terminating the charging process, is activated to protect the battery.

In conventional battery management systems, the circuits designed for charging and protection functions are located on different chips. The circuit for the charging function may be integrated into one chip and sealed as an apparatus outside a battery package. The circuit for the protection function may be integrated into another chip and sealed with the battery inside the battery package. In these conventional applications, since two separate packages are needed for charging the rechargeable battery, it is not convenient enough especially for use by portable electronic devices. Some designers have tried to integrate both charging and protection functions into a single chip and seal the chip with the battery inside the battery package.

However, the simple combination of two circuits makes the chip size much larger. The chip integrating with both charging and protection functions is larger and much more complex than a chip with only one function. Sealing the combined chip within the battery package increases the size of the battery package even more. Therefore, it is needed an efficient system for providing the charging and protection functions to portable electronic devices, and it is to such system the present invention is primarily directed.

SUMMARY OF THE INVENTION

In one embodiment, there is disclosed a power system coupled to at least one battery. The power system includes a switching circuit coupled to the at least one battery and a sensing circuit for sensing a temperature of the at least one battery. The sensing circuit generates a signal based on the temperature. The power system includes a power management unit. The power management unit is capable of monitoring a voltage and a current of the at least one battery, receiving the signal from the sensing circuit and switching off the switching circuit when an abnormal condition is sensed by the power management unit.

In yet another embodiment, there is disclosed a method for protecting a battery in an operating mode. The battery having a temperature, a voltage and a current. The method includes the steps of generating a plurality of reference voltages, generating a first signal based upon the temperature of the battery, generating a second signal based upon the voltage of the battery and generating a third signal based upon the current flowing through the battery. The method also includes the steps of generating a control signal based upon the first, second and third signals and stopping the operating mode of the battery according to the control signal.

In yet another embodiment, there is disclosed a portable computer. The portable computer includes an input device for taking inputs from a user, a microcontroller for performing operations based on the inputs from the user, at least one battery for powering the portable computer and a power system for managing the at least one battery. The power system includes a switching circuit coupled to the at least one battery, a sensing circuit and a power management unit. The sensing circuit is for sensing a temperature of the at least one battery and generating a signal according to the temperature. The power management unit monitors a voltage and a current of the at least one battery, receives the signal from the sensing circuit and switches off the switching circuit when an abnormal condition is sensed by the power management unit.

BRIEF DESCRIPTION OF THE DRAWINGS

Advantages of the present invention is apparent from the following detailed description of exemplary embodiments thereof, which description should be considered in conjunction with the accompanying drawings, in which.

DETAILED DESCRIPTION OF THE INVENTION

The present invention provides a power management system for management of charging, discharging and protection functions of rechargeable batteries. Since the embodiments shown in the drawings are only for illustrative purposes, some sub-components and/or peripheral components generally incorporated in the power management system are omitted herein. In describing the preferred embodiments, specific terminologies are employed for the sake of clarity. However, the disclosure of this patent specification is not intended to be limited to the selected terminology and the specified embodiments. It is understood that each specific element includes all technical equivalents that operate in a similar manner.

Figure 1:
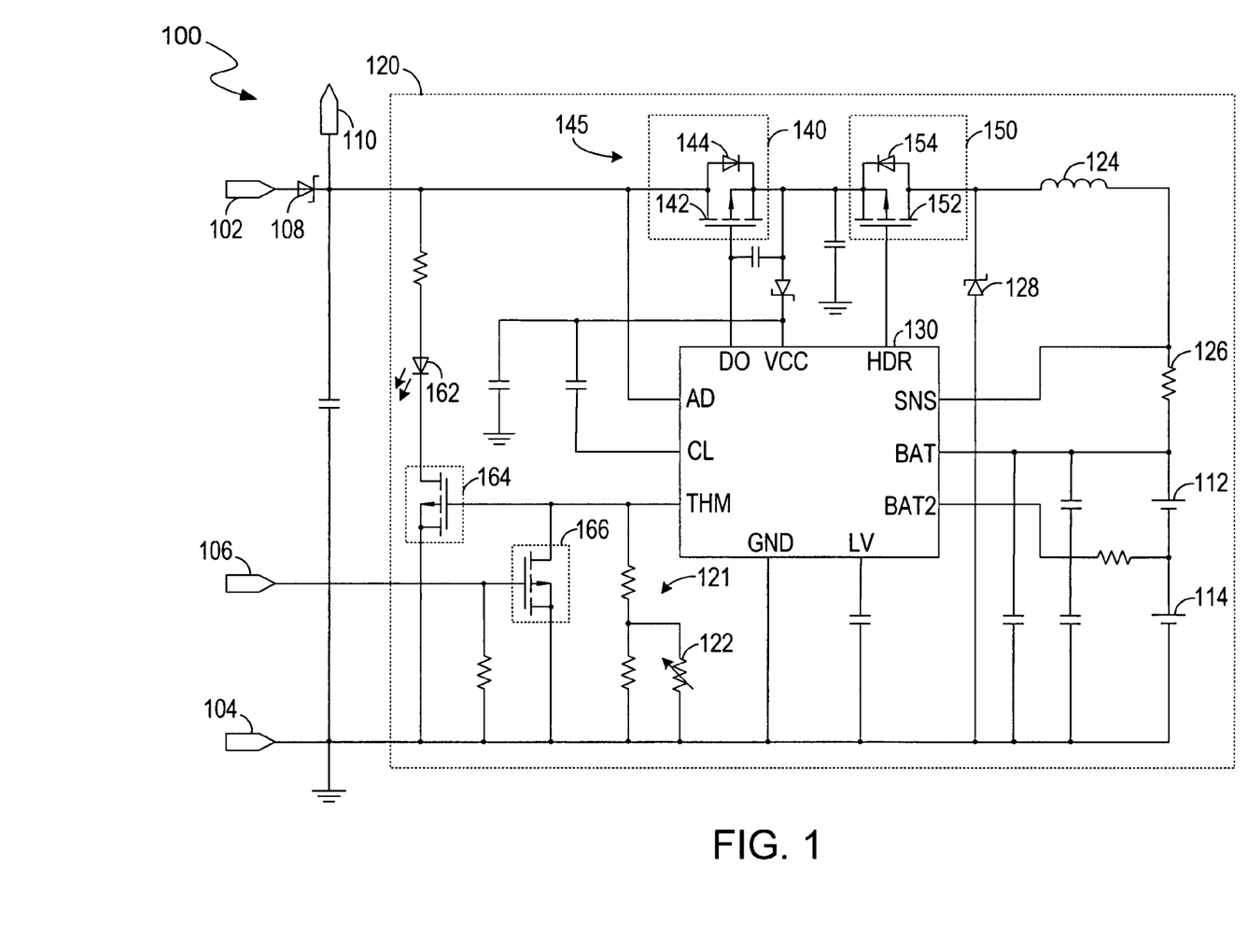
FIG. 1 is a simplified schematic diagram of a preferred exemplary circuit according to one embodiment of the invention.

FIG. 1 illustrates a schematic diagram of an exemplary circuit 100. The circuit 100 mainly includes a power system 120. The circuit 100 includes input ports 102, 104 and 106 and an output port 110. The input port 102 is for connecting to an external power source such as an adapter. The output port 110 is for connecting to a system load (not shown in FIG. 1). The adapter supplies power to the system load and the power system 120. The input port 104 is a negative terminal of the circuit 100 and usually connected to the ground. A control signal may be applied to the power system 120 via the input port 106 to control a charging process of the power system 120.

A diode 108 is coupled between the input port 102 and the power system 120. The diode 108 allows a current flowing from the adapter to the power system 120 and prevents a reverse current flowing from the power system 120 to the adapter. A switching circuit 145 is coupled to the diode 108. The switching circuit 145 includes a discharge switch 140 and a charge switch 150. The discharge switch 140 of the switching circuit 145 may be constructed as a parallel connection of a transistor 142 and a diode 144. The diode 144 may be a body diode within the transistor 142. Similarly, the charge switch 150 may be constructed as a parallel connection of a transistor 152 and a diode 154. The diode 154 may be a body diode within the transistor 152.

An inductor 124, a resistor 126, batteries 112 and 114 are connected in series between the switching circuit 145 and the ground. The batteries 112 and 114 are rechargeable batteries. In the present invention, one or more rechargeable batteries can be coupled to the power system 120 with correlated connections adjusted. When the adapter is coupled to the input port 102, the adapter supplies power to drive the system load through the output port 110. The adapter can also charge the batteries 112 and 114 through the switching circuit 145, the inductor 124 and the resistor 126 if the batteries 112 and 114 are not full of capacity. Thus the power system 120 will work in a charging mode. If no battery is connected, the adapter only supplies power to the system load. If no adapter is coupled to the circuit 100, the batteries 112 and 114 supply power to the system load when needed. Thus the power system 120 will work in a discharging mode.

The power system 120 includes a power management unit 130 to manage charging, discharging and protection functions of the batteries 112 and 114. The power management unit 130 can be integrated into an integrated circuit (IC) chip. A terminal DO of the power management unit 130 is connected to a gate terminal of the transistor 142 to control the states of the discharge switch 140. If the terminal DO is set to an ON state (logic 0), the transistor 142 is turned on to switch on the discharge switch 140. If the terminal DO is set to an OFF state (logic 1), the transistor 142 is turned off to switch off the discharge switch 140. Similarly, a terminal HDR of the power management unit 130 is connected to a gate terminal of the transistor 152 to control the states of the charge switch 150. If the terminal HDR is set to an ON state (logic 0), the transistor 152 is turned on to switch on the charge switch 150. If the terminal HDR is set to an OFF state (logic 1), the transistor 152 is turned off to switch off the charge switch 150. The terminal HDR can also be set as a pulse width modulation (PWM) signal to switch on and off the charge switch 150 periodically.

If the adapter is coupled to the circuit 100, the adapter also supplies power to a terminal VCC of the power management unit 130 via the diode 144 of the discharge switch 140. If the adapter is absent, the batteries 112 and 114 will supply power to the terminal VCC via the diode 154 of the charge switch 150.

If the adapter is coupled to the circuit 100, the terminal HDR of the power management unit 130 is set as the PWM signal to turn on and off the charge switch 150 periodically. Then the power system 120 works in the charging mode. A charge current flows from the adapter through the diode 144, the transistor 152, the inductor 124 and the resistor 126 to charge the batteries 112 and 114. The power management unit 130 monitors the voltages of the batteries 112 and 114. When the batteries 112 and 114 are fully charged, the power management unit 130 sets the terminal HDR to an OFF state to turn off the charge switch 150. Thus the switching circuit 145 is switched off. Then the charging mode is stopped and no charge current flows from the adapter to the batteries 112 and 114.

A transistor 166 is coupled between a terminal THM of the power management unit 130 and the ground. A gate terminal of the transistor 166 is coupled to the input port 106, thus the states of the transistor 166 are controlled by the signal from the input port 106. If the signal at the input port 106 is at logic 1, the transistor 166 will be turned on. Hence, the voltage at the terminal THM is pulled to the ground if the power system 120 is working in the charging mode. The power management unit 130 then sets the terminal HDR to an OFF state to turn off the charge switch 150 to terminate the charging process.

If the adapter is absent, a terminal DO of the power management unit 130 is set to an ON state to switch on the discharge switch 140. Then the power system 120 will work in the discharging mode. The batteries 112 and 114 supply power to the system load via the diode 154 and the transistor 142. The power management unit 130 monitors the voltages of the batteries 112 and 114. If the voltage of the battery 112 and/or 114 is lower than a predetermined low threshold, the power management unit 130 can set the terminal DO to an OFF state to turn off the discharge switch 140. Thus the switching circuit 145 is switched off and the discharging mode is stopped.

A terminal BAT of the power management 130 is coupled to the anode of the battery 112 and a terminal BAT2 is coupled to the anode of the battery 114. When the power system 120 is in operating, the voltages of the batteries 112 and 114 are monitored continuously via the terminals BAT and BAT2. During the charging process, the power management 130 sets the terminal HDR to an OFF state to turn off the charge switch 150 if the voltage of the battery 112 and/or 114 is higher than a predetermined high threshold. Thus the charging process is terminated by switching off the switching circuit 145. This operation protects the batteries 112 and 114 from over voltage during the charging process. During a discharging process, the power management unit 130 sets the terminal DO to an OFF state to turn off the discharge switch 140 if the voltage of the battery 112 and/or 114 is lower than the predetermined low threshold. Thus, the discharging process is terminated by switching off the switching circuit 145. This operation protects the batteries 112 and 114 from over discharge during the discharging process.

The resistor 126 is coupled between a terminal SNS and the terminal BAT of the power management unit 130. The power management unit 130 monitors a current flowing through the resistor 126 by the terminals SNS and BAT. When the current increases, the voltage on the resistor 126 increases accordingly. When the voltage is higher than a predetermined value during the charging process, the terminal HDR is set to an OFF state to turn off the charge switch 150. Thus the charging mode ends. Likely, when the voltage is higher than the predetermined value during the discharging process, the terminal DO is set to an OFF state to turn off the discharge switch 140. Thus the discharging mode ends. This current detection function protects the batteries 112 and 114 and the whole circuit 100 from any damage caused by over current.

In the power system 120, a temperature sensing circuit 121 for sensing a surface temperature of the batteries 112 and 114 is coupled to the terminal THM of the power management unit 130. The temperature sensing circuit 121 mainly includes a thermistor 122. When the power system 120 is working in the charging mode, the power management unit 130 provides a current to the thermistor 122 via the terminal THM. As the temperature of the batteries 112 and 114 varies, the resistance of the thermistor varies accordingly. The voltage on the thermistor 122 varies responsive to the resistance variation of the thermistor 122. The voltage of thermistor 122 is sensed by the power management unit 130 at the terminal THM. If the voltage exceeds a predetermined voltage range, the terminal HDR of the power management unit 130 is set to an OFF state to stop the charging mode. This protection operation is capable of avoiding any excessive high/low temperature situation that may affect the performances and the lifespan of the batteries 112 and 114. The voltage range is regulated by predetermined high/low threshold temperatures and the embedded batteries can work effectively within the predetermined high/low threshold temperature.

In the power system 120, a LED light 162 is connected with a transistor 164 in series between the diode 108 and the ground. The power management unit 130 controls the states of the transistor 164. When the power system 120 is working properly, the transistor 164 is set to an ON state by a signal from the terminal THM. Thus the LED light 162 is turned on and lights continuously. If an abnormal condition occurs, such as a battery is overheated, the current flowing through the resistor 126 is too large or a battery is over voltage, the signal at the terminal THM is set as a periodic pulse signal to change the states of the transistor 164 periodically. Thus the LED light 162 is blinking in response to the periodic pulse signal. This means that the LED light 162 lights persistently to inform the users that the power system 120 is working properly. The LED light 162 blinks to inform the users that the working mode of the power system 120 is terminated in response to the abnormal condition.

In the present invention, the value of the charge current is adjustable under control of the power management unit 130. A diode 128 may be coupled between the inductor 124 and the ground. When the power system 120 is working in the charging mode, the power management unit 130 sets the terminal HDR as the PWM signal to change the states of the charge switch 150 periodically. A discrete current flows from the charge switch 150 into the inductor 124. If the charge switch 150 is on, the charge current flows from the adapter to the inductor 124. Some power from the adapter is transferred to the batteries 112 and 114, while some other power is stored in the inductor 124. If the charge switch 150 is off, the charge current flows from the diode 128 to the inductor 124. The inductor 124 transfers the stored power to the batteries 112 and 114. Thus, the inductor 124 generates a continuous current to charge the batteries 112 and 114. The value of the charge current can be adjusted to a desired value by modulating the ON time interval of the PWM signal at the terminal HDR. The longer the on period of the PWM signal is, the larger the charge current will be.

Figure 2:
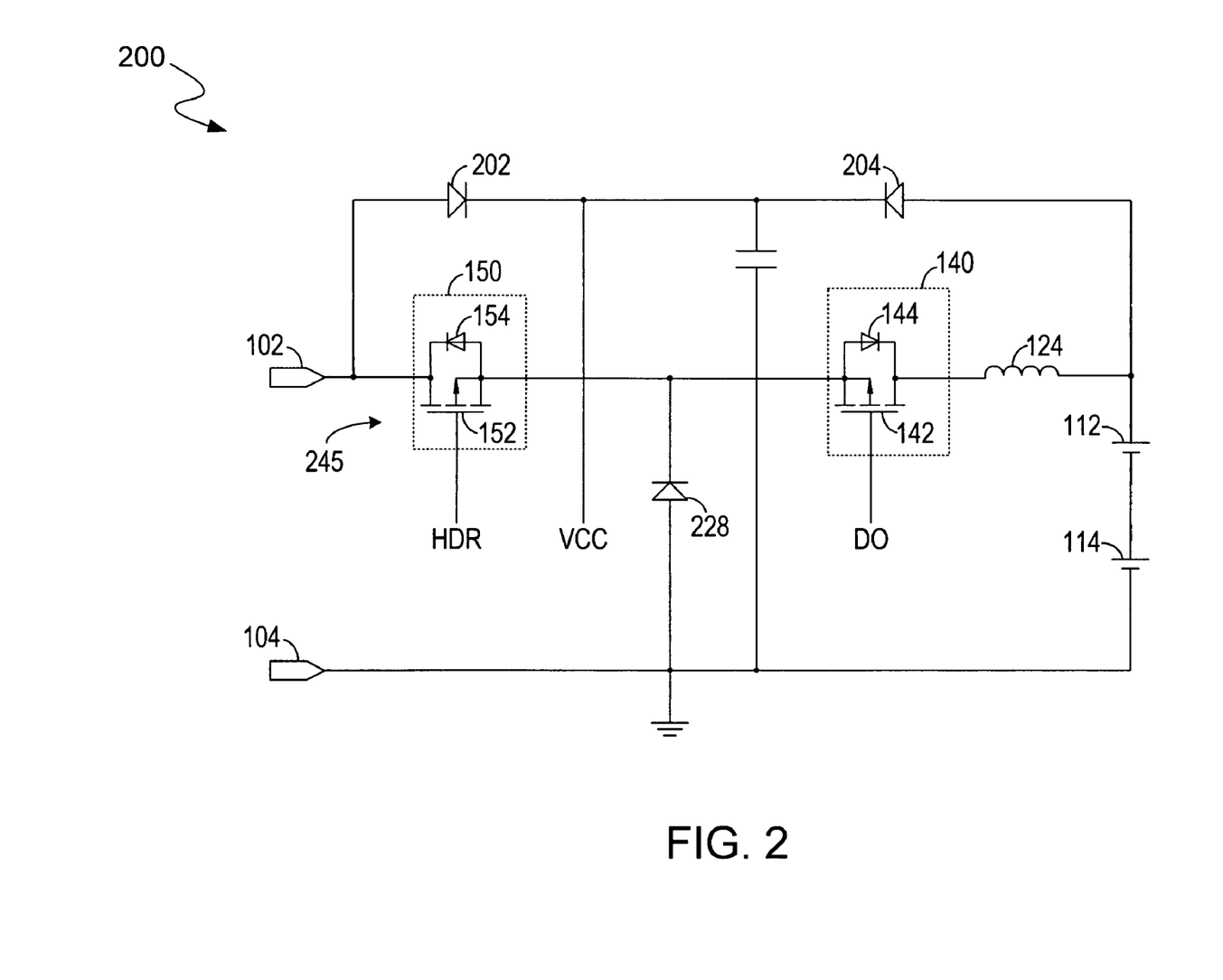
FIG. 2 is a simplified schematic diagram of another preferred exemplary circuit according to one embodiment of the invention.

FIG. 2 illustrates an exemplary circuit according to another embodiment of the invention. In FIG. 2, the same components as in FIG. 1 are indicated by same reference numerals and some same circuits omitted herein can be found in FIG. 1 entirely. A power system 200 in FIG. 2 and the power system 120 in FIG. 1 have main difference in the switching circuit 245 and the switching circuit 145. The arrangement of other components not mentioned here remains the same as that in FIG. 1, such as the power management unit 130, the batteries 112 and 114, etc.

In FIG. 2, diodes 202 and 204 are coupled sequentially between the input port 102 and the batteries 112 and 114. If an external power source such as an adapter is coupled to the input port 102, the adapter supplies power to the terminal VCC of the power management unit 130 via the diode 202. If the adapter is absent, the batteries 112 and 114 supply power to the terminal VCC of the power management unit 130 via the diode 204. The switching circuit 245 includes the charge switch 150 and the discharge switch 140. The charge switch 150, the discharge switch 140 and the inductor 124 are connected in series between the input port 102 and the anode of the battery 112. When the terminal HDR is set to an ON state to turn on the charge switch 150, a charge current flows through the transistor 152, the diode 144 and the inductor 124 to charge the batteries 112 and 114. When the terminal HDR is set to an OFF state, the charge switch 150 is turned off to prevent the charge current from flowing through the charge switch 150. When the terminal DO is set to an ON state to turn on the discharge switch 140, a discharge current flows from the batteries 112 and 114 through the inductor 124, the transistor 142 and the diode 154 to a system load. When the terminal DO is set to an OFF state, the discharge switch 140 is off to prevent the discharge current from flowing through the discharge switch 140 to the system load.

It is widely known that leakage currents exist if diodes/transistors have reverse bias voltages. In the power system 120, when the discharging mode is terminated by turning off the discharge switch 140, a leakage current flows through the discharge switch 140 and another leakage current flows through the diode 128. The total leakage current flowing out from the batteries 112 and 114 is a sum of the currents flowing though the discharge switch 140 and the diode 128. In the power system 200, when the discharging mode is terminated by turning off the discharge switch 140, a leakage current flows from the batteries 112 and 114 through the discharge switch 140 and a diode 228 to the negative terminal of the power system 200. Hence, the leakage current in the power system 200 of FIG. 2 is much smaller than the leakage current of the power system 120 of FIG. 1. Thus, the decreased leakage current further improves the performance of the circuit 100 and can protect the batteries 112 and 114 more effectively from over discharge.

Figure 3:
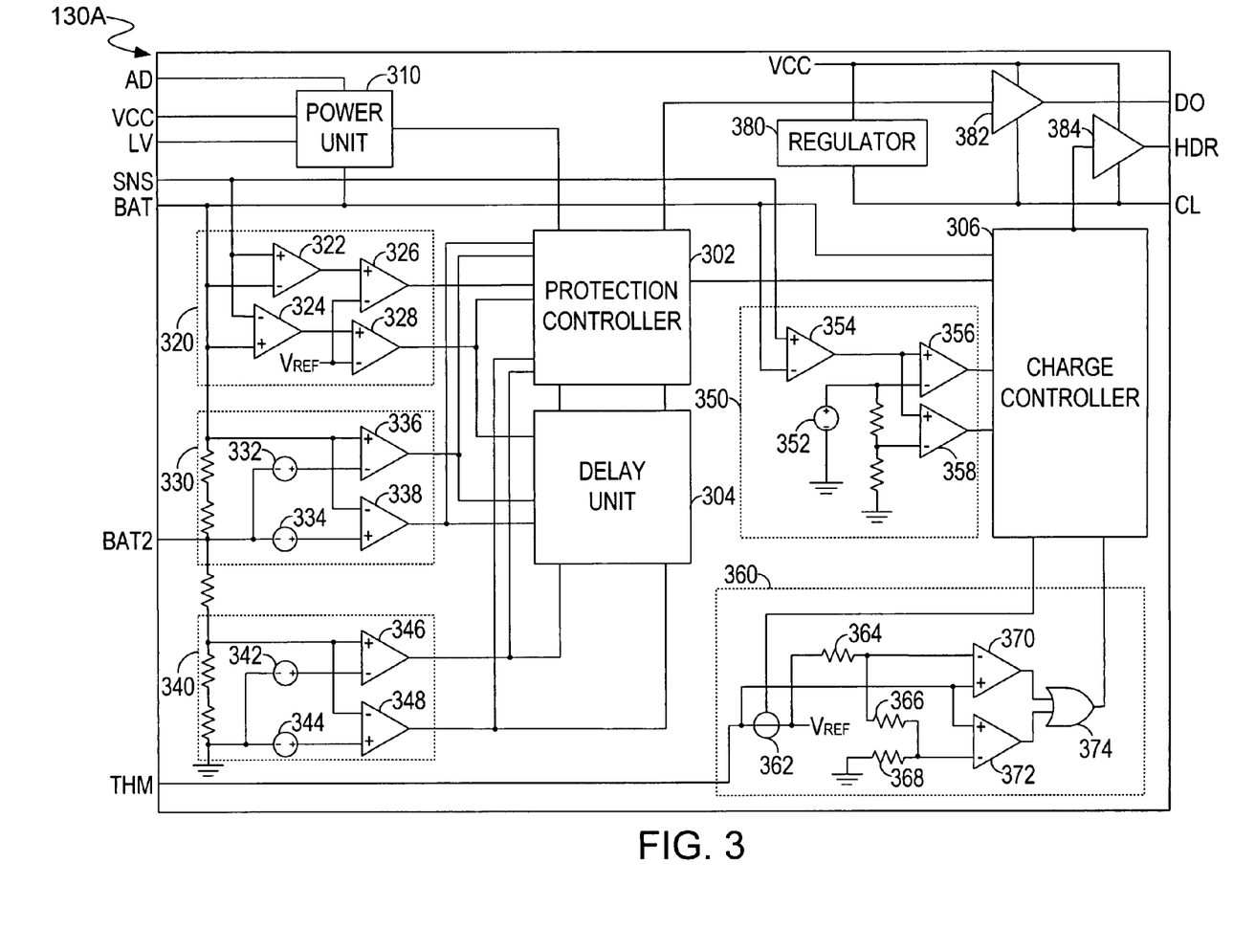
FIG. 3 is a schematic diagram of an exemplary power management unit consistent with the embodiment in FIG. 1.

FIG. 3 is a schematic diagram of the power management unit 130 in FIG. 1 according to one embodiment of the invention. The power management unit 130A is used to control the charging, discharging and protection functions for the power system 120. The power management unit 130A includes a power unit 310, a protection controller 302 and a charge controller 306. The power unit 310 detects the presence/absence of the adapter via a terminal AD. The power unit 310 provides a signal to the protection controller 302 as well as the charge controller 306 to indicate whether the adapter exists. If the adapter exists, the charge controller 306 sets the terminal HDR as the PWM signal to enable the charging function.

Also, the protection controller 302 sets the terminal DO to an OFF state to disable the discharging function. If the adapter is absent, the protection controller 302 sets the terminal DO to an ON state to enable the discharging function and the charge controller 306 sets the terminal HDR to an OFF state to disable the charging function. The power unit 310 is supplied with voltages from the terminals AD and VCC. Then the power unit 310 generates a voltage and applies this voltage to a terminal LV of the power management unit 130A.

The power management unit 130A also includes a regulator 380 and drivers 382 and 384. The regulator 380 and the drivers 382 and 384 are supplied with the voltage from the terminal VCC. The regulator 380 converts the voltage from the terminal VCC to a lower voltage and supplies the lower voltage to the derivers 382 and 384 as well as a terminal CL. The driver 382 is controlled by a control signal from the protection controller 302. The driver 384 is controlled by a control signal from the charge controller 306. The terminal DO can be set to an ON/OFF state by setting the driver 382 at the voltage value of the terminal VCC/CL. Similarly, the terminal HDR can be set to an ON/OFF state by setting the driver 384 at the voltage value of the terminal VCC/CL.

Since the battery 112 is connected between the terminal BAT and BAT2, a voltage detector 330 is coupled between the terminal BAT and BAT2 to detect the voltage of the battery 112. The voltage detector 330 sends a signal indicative of the voltage of the battery 112 to the protection controller 302. A voltage detector 340 is coupled between the terminal BAT2 and the ground to detect the voltage of the battery 114. The voltage detector 340 sends a signal indicative of the voltage of the battery 114 to the protection controller 302.

The voltage detector 330 includes reference voltage sources 332 and 334 and comparators 336 and 338. The reference voltage source 332 and 334 are used to generate a permitted highest voltage and a permitted lowest voltage to regulate a predetermined voltage range. The comparators 336 and 338 are used to compare the voltage of the battery 112 with the predetermined voltage range. If the battery voltage is within the predetermined voltage range, the battery voltage detector 330 sends a signal (logic 0) to the protection controller 302. If the battery voltage is outside the predetermined voltage range, such as larger than the permitted highest voltage or smaller than the permitted lowest voltage, another signal (logic 1) will be applied to the protection controller 302 to indicate an abnormal voltage of the battery 112. During the discharging process, the protection controller 302 sends a control signal to the driver 382 to sets the terminal DO to an OFF state if the protection controller 302 receives the signal indicating the abnormal voltage. Thus the discharging process will be terminated. During the charging process, the protection controller 302 sends a signal to the charge controller 306 if the protection controller 302 receives the signal indicating the abnormal voltage. Then the charge controller 306 applies a control signal to the driver 384 to set the terminal HDR to an OFF state to terminate the charging process.

The voltage of the battery 114 is also detected simultaneously by the voltage detector 340 in a similar manner. The voltage detector 340 has a similar topology with the voltage detector 330, including reference voltages 342 and 344 used to regulate a predetermined voltage range. The voltage detector 340 also includes comparators 346 and 348 to compare the battery voltage with the predetermined voltage range. If the voltage of the battery 114 exceeds the predetermined voltage range, the working mode of the power system 120 will be terminated. The predetermined voltage ranges of the batteries 112 and 114 may be different because the predetermined voltage ranges can be set separately based on the different property of the batteries 112 and 114. Thus, we can protect the batteries 112 and 114 from excessive high/low voltages.

A delay unit 304 may be coupled between the protection controller 302 and the voltage detectors 330 and 340. With the delay unit 304, the signals from the voltage detectors 330 and 340 are sent to the protection controller 302 after a time delay. In case any momentary abnormal voltage that does not affect the battery performance, the delay unit 304 postpones the protection operation activated by the protection controller 302. The delay time period should be set at a proper value. If the abnormal voltage situation lasts longer than the delay time period, the protection operation such as terminating the working mode of the power system 120 will be activated.

When the power system 120 is in operating, the current flowing through the batteries is also monitored to prevent an excessive large current from destroying the batteries 112 and 114 or the power system 120. The voltage drop on the resistor 126 is monitored by the power management unit 130A at the terminals SNS and BAT. The current can be obtained from the voltage and the resistance of the resistor 126. A current detector 320 is employed to detect if the voltage of the resistor 126 is too large.

The current detector 320 includes a reference voltage source Vref, amplifiers 322 and 324 and comparators 326 and 328. When the power system 120 is working in the discharging mode, the comparator 328 sends a signal (logic 1) to the protection controller 302 if the voltage drop on the resistor 126 is larger than the reference voltage Vref. Then the protection controller 302 will send a control signal to the driver 382 to set the terminal DO to an OFF state. Thus, the discharging mode is terminated.

When the power system 120 is working in the charging mode, the voltage on the resistor 126 is also transferred to a current detector 350 that is coupled to the charge controller 306. The current detector 350 includes a reference voltage source 352, an amplifier 354 and comparators 356 and 358. If the voltage of the resistor 126 is higher than the reference voltage 352, the current detector 350 outputs a control signal to the charge controller 306. The charge controller 306 then set the terminal HDR to an OFF state to terminate the charging mode. In this operation, if the current flowing through the batteries is higher than a predetermined value, the working mode is terminated instantly to protect the power system 120 from damage of over current.

The efficiencies and life-spans of the rechargeable batteries may be affected if the batteries are charged when the battery temperature is excessive high/low. So it is crucial to protect the rechargeable batteries 112 and 114 from excessive high/low temperatures during the charging process. The management unit 130A provides a function of protecting the batteries 112 and 114 from excessive high/low temperature. A temperature detector. 360 is coupled between the charge controller 306 and the terminal THM of the power management unit 130A. The voltage of the thermistor 122 (shown in FIG. 1) is indicative of the surface temperature of the batteries 112 and 114. The voltage is transferred to the temperature detector 360 via the terminal THM. Then the temperature detector 360 applies a signal to the charge controller 306 to control the charging process.

The temperature detector 360 includes a current source 362, a reference voltage source Vref, resistors 364, 366 and 368, comparators 370 and 372 and an OR gate 374. The current source 362 is coupled between the terminal THM and the resistor 364. The states of the current source 362 are controlled by the charge controller 306. When the power system 120 is working in the charging mode, the current source 362 is turned on by a signal from the charge controller 306. The current source 362 supplies a current via the terminal THM to the thermistor 122. The voltage of the thermistor 122 is transferred to the comparators 370 and 372 via the terminal THM. The resistors 364, 366 and 368 are connected in series for obtaining divided reference voltages to regulate a permitted voltage range. If the voltage of the thermistor 122 is out of the permitted voltage range, one of the comparators 370 and 372 applies a signal at logic 1 to the OR gate 374. Thus the OR gate 374 sends a signal at logic 1 to the charge controller 306. Then, the charge controller will send a control signal to the driver 384 to set the terminal HDR to an OFF state. Thus the charging mode will be stopped. It is appreciated by those skilled in the art that during the charging process, if the temperature of the batteries is excessive high/low, the charging process is terminated to protect the batteries from damage. When the battery temperature recovers to a permitted value, the charging process can be activated again by setting the terminal HDR as the PWM signal.

Figure 4:
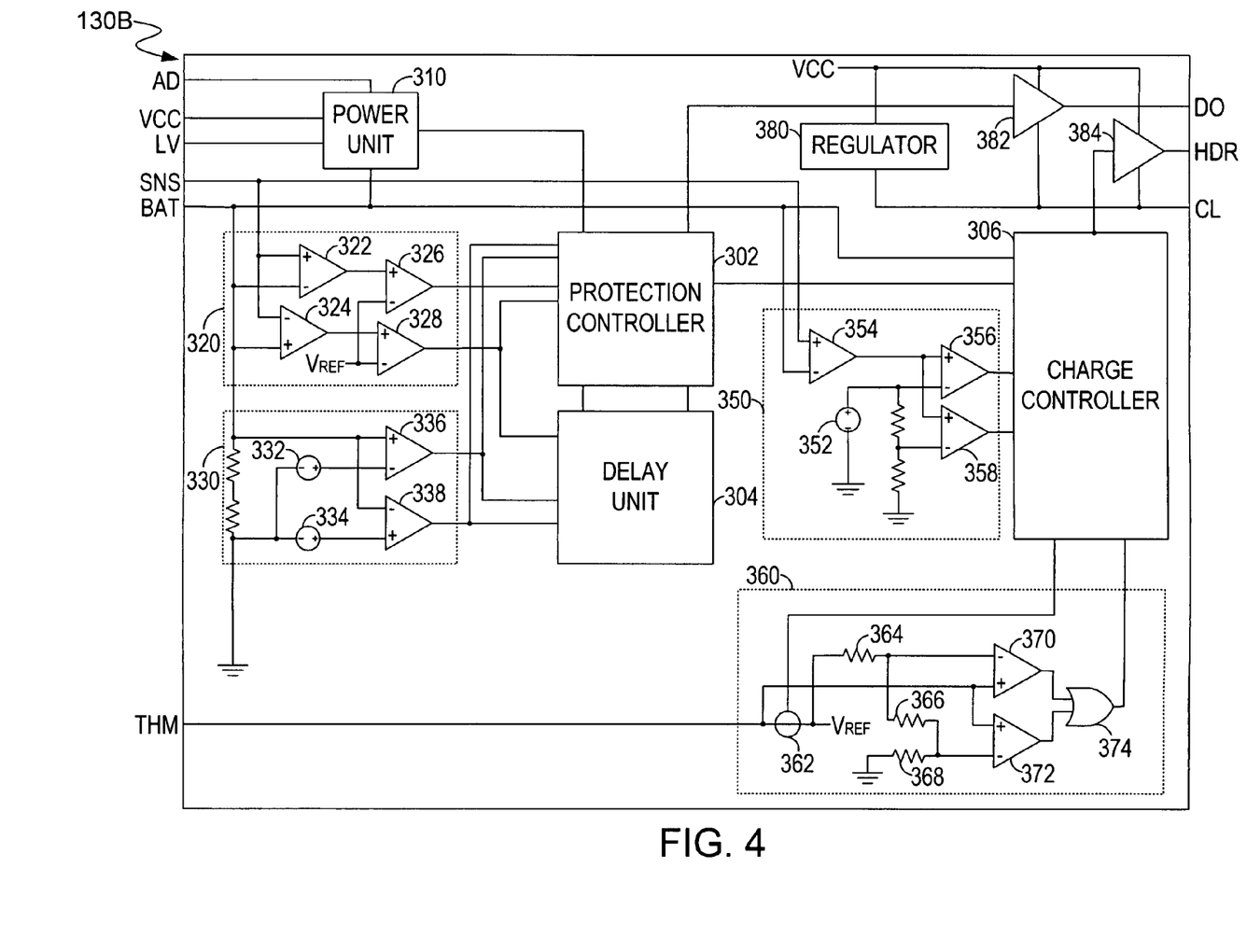
FIG. 4 is another schematic diagram of an exemplary power management unit consistent with the embodiment in FIG. 1.

FIG. 4 depicts another embodiment of the power management unit 130. In this figure, the same components as in FIG. 3 are indicated by the same reference numerals for clarity. In this embodiment, a rechargeable battery 112 is designed to be connected to the power system 120 between the terminal BAT and the ground. All the functions, such as voltage detecting, current detecting and battery temperature sensing are implemented in the same manner as those in FIG. 3. Hence, the similar description is simplified herein for clarity.

The battery voltage detector 330 is coupled between the terminal BAT and the protection controller 302. The voltage detector 330 monitors the voltage of the battery 112 (shown in FIG. 1). If the battery voltage exceeds the predetermined range, the protection controller 302 sets the terminal DO to an OFF state to stop the working mode of the power system 120. The current detector 350 detects the current of the battery 112 and protects the power system 120 from an excessive large current. The temperature detector 360 prevents the power system 120 from charging the battery 112 in an excessive high/low temperature condition.

In the present invention, a plurality of reference voltages is needed. The power management unit 130 includes a trim translation unit 500 (not shown in FIGS. 3 and 4) and a trimming unit (not shown in the FIGS.) to generate the plurality reference voltages. The trim translation unit 500 receives the voltage from the adapter and generates standard trimming signals to the trimming unit. The trimming unit then generates a plurality of reference voltages based on the trimming signals from the trim translation unit 500. The trimming unit also provides signals to adjust the delay time of the delay unit 304 and internal oscillator frequencies.

Figure 5:
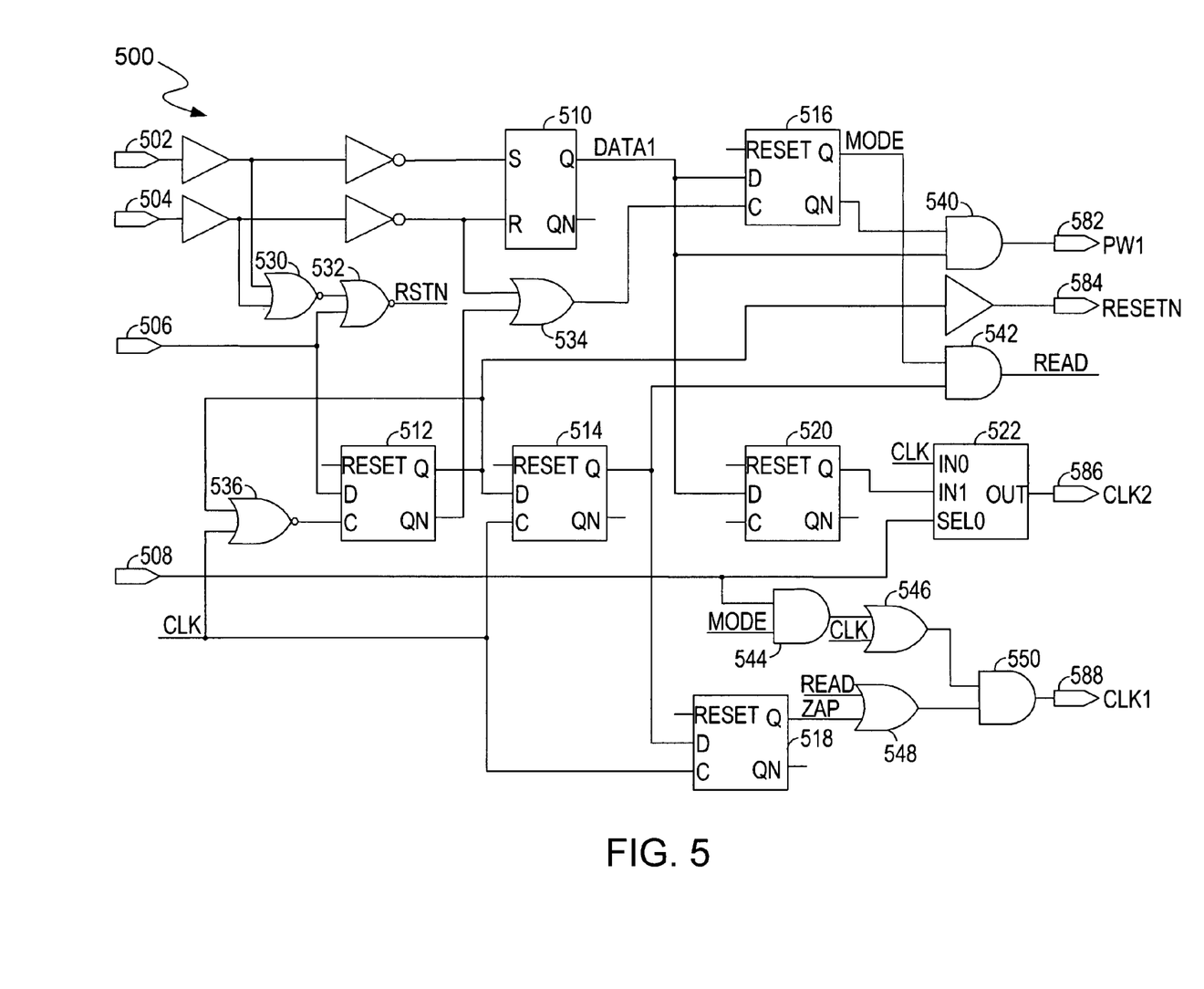
FIG. 5 is a block diagram of a trim signal translation unit consistent with the embodiment in FIGS. 3 and 4.

FIG. 5 depicts a block diagram of the trim translation unit 500. The trim translation unit 500 includes an input port 502 coupled to the terminal THM to receive a signal CLK, an input port 504 coupled to the terminal AD to receive a signal DATA, an input port 506 to receive a control signal and an input port 508 to receive a signal PDB. The trim translation unit 500 includes a latch circuit usually a RS flip-flop 510, a plurality of D flip-flops 512, 514, 516, 518 and 520 and a selector 522. The trim translation unit 500 includes a port 582 to output a signal PW1, a port 584 to output a signal RESETN, a port 586 to output a signal CLK2 and a port 588 to output a signal CLK1.

The input signals CLK and DATA are supplied to a NAND gate 530. A NAND gate 532 receives a signal from the input port 506 and the output signal of the NAND gate 530 to generate a RSTN signal. The RSTN signal is supplied to the D flip-flops 512, 514, 516, 518 and 520. If the signal at the input port 506 is set to logic 1, the trim translation unit 500 is activated to work by the RSTN signal. If the signal at the input port 506 is set to logic 0, the trim translation unit 500 stops working.

When the trim translation unit 500 starts to work, the signals DATA and CLK at a first duty cycle of the CLK signal are used to decide an operation mode. The input signals CLK and DATA are supplied to the RS flip-flop 510 via inverters separately. The RS flip-flop 510 output a signal DATA1. The signal DATA1 is set to logic 0 if the signal CLK is at logic 1 and the signal DATA is at logic 1 during the first duty cycle. The signal DATA1 is applied to the D flip-flop 516 to generate a signal MODE at logic 0. The signal MODE at logic 0 is applied to an AND gate 542 to generate a signal READ at logic 0. Since the signal CLK is at logic 1, the D flip-flop 518 generates a signal ZAP at logic 1. Thus, the trim translation unit 500 will work in a ZAPPING mode after the first duty cycle.

When the trim translation unit 500 is working in the ZAPPING mode, the signal MODE and the signal READ are set to logic 0. An AND gate 544 receives the signal MODE to generate a signal at logic 0 to an OR gate 546. The OR gate 546 also has an input signal CLK. Thus the OR gate 546 generates a signal having a same waveform as the signal CLK. Since the signal ZAP is at logic 1, an OR gate 548 generates a signal at logic 1 with the input signals ZAP and READ. An AND gate 550 receives the signals from the OR gates 546 and 548 and generates the signal CLK1 at the port 588. Thus, the signal CLK1 has a waveform same as the waveform of the signal CLK. An AND gate 540 has two input signals, one is DATA1 and the other is an output signal of the D flip-flop 516. Since the signal MODE is at logic 0, the output signal PW1 of the AND gate 540 is a pulse wave having positive pulse when the signal DATA has a negative pulse. At the falling edge of the first duty cycle of the signal CLK, the D flip-flop 512 set the output signal RESENTN to logic 1.

During the first duty cycle, the output signal DATA1 of the RS flip-flop 510 has a positive pulse if the input signal DATA has a negative pulse. Thus, the D flip-flop 516 sets the signal MODE to logic 1. The AND gate 542 sets the signal READ to logic 1. Then the trim translation unit 500 will work in a READ mode.

When the trim translation unit 500 is working in the READ mode, the output signal MODE of the D flip-flop 516 and the signal READ are set to logic 1. The output signal PW1 of the AND gate 540 is set to logic 0. Since the input signal PDB at the port 508 is set to logic 1 during the READ mode, the AND gate 544 receives the signals MODE and PDB to generate a signal having a same waveform as the signal MODE. The signal MODE is set to logic 1 at a falling edge of the input signal DATA. Then the OR gate 546 sets the output signal having the same waveform as the signal MODE to the AND gate 550. The OR gate 548 sends the signal at logic 1 to the AND gate 550. Thus the AND gate 550 sets the signal CLK1 to logic 1 at the falling edge of the input signal DATA during the first duty cycle. The selector 522 is coupled to the D flip-flop 520 to output a signal CLK2 at the port 586. The selector 522 has one control signal PDB and two input signals, CLK and the output signal of the D flip-flop 520. Since the signal PDB is set to logic 1 during the READ mode, the selector 522 selects the input signal CLK at a terminal IN0 as an output signal. Thus the signal CLK2 has a waveform same as the signal CLK after the first duty cycle.

When the READ mode ends, the trim translation unit 500 starts a QUASI-ZAPPING mode automatically. Then the output signal MODE of the D flip-flop 516 is set to logic 0. The output signal of the OR gate 546 is set to have a waveform same as the signal CLK. Thus, the output signal CLK1 has a waveform same as the signal CLK during the QUASI-ZAPPING mode. The PDB signal is set to logic 0 to drive the selector 522 selecting an input signal at a terminal IN1 as the output signal CLK2. Thus, if the signal DATA has a negative pulse when the signal CLK is at logic 1 of a duty cycle, the signal CLK2 will be set to logic 1 during the next duty cycle.

Figure 6:
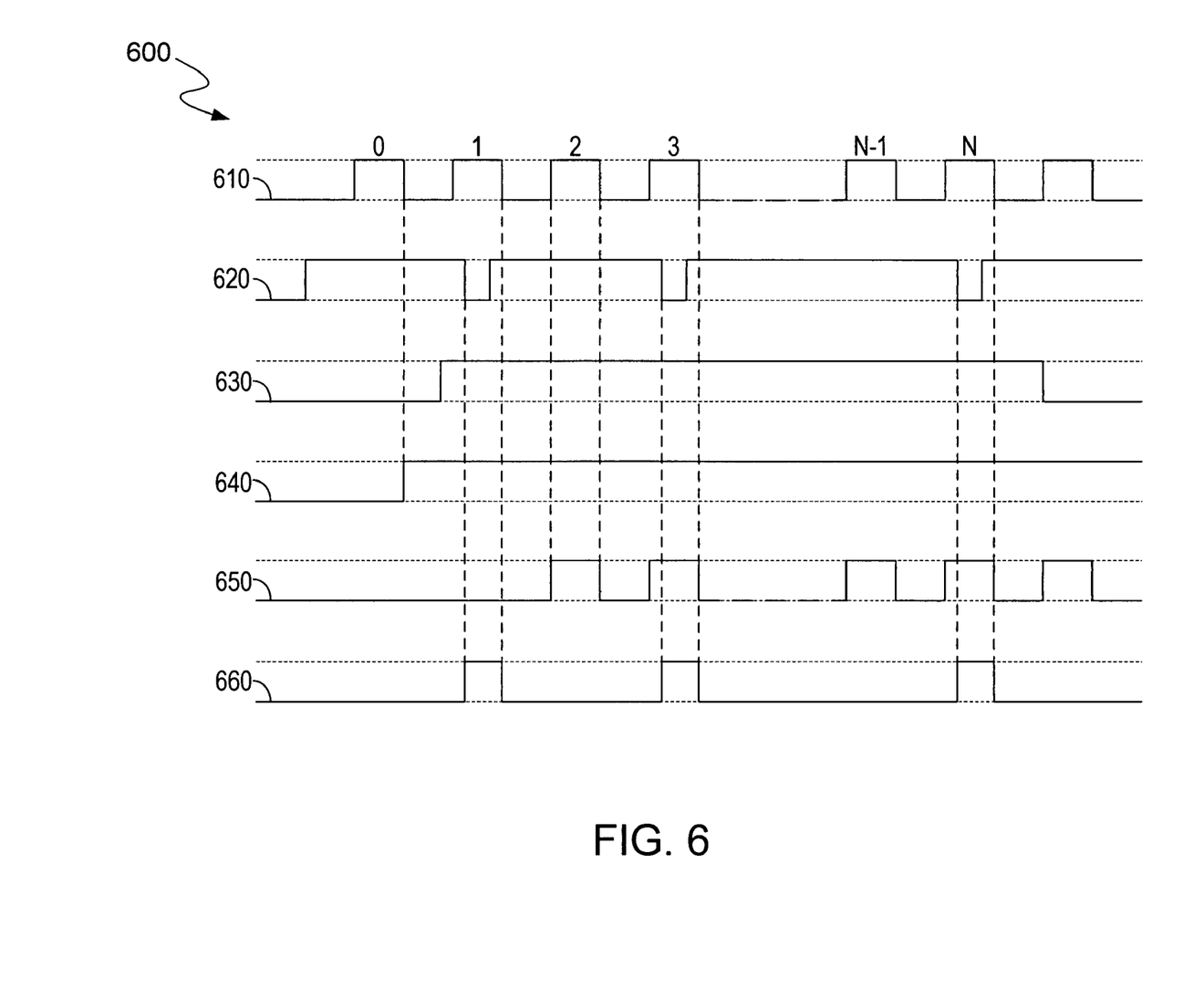
FIG. 6 illustrates signal waveforms at a ZAPPING mode of the trim signal translation unit consistent with the embodiment in FIG. 5.

FIG. 6 depicts waveforms 600 when the trim translation unit 500 is working in the ZAPPING mode. Waveforms 610, 620, 630, 640, 650 and 660 illustrates the signal CLK, the signal DATA, a signal PROG, the signal RESETN, the signal CLK1 and the signal PW1, respectively. The waveforms at the first duty cycle, cycle 0 of the signal CLK 610 are for mode decision. Since both of the signals CLK 610 and DATA 620 are at logic 1 during the cycle 0, the trim translation unit 500 works in the ZAPPING mode. The signal PROG 630 is set to logic 1 after cycle 0. The signal RESETN 640 is set to logic 1 at the falling edge of cycle 0 of the CLK signal 610. The signal CLK1 650 has a waveform same as the signal CLK 610 from cycle 2. The signal PW1 660 has positive pulses if the signal DATA 620 has negative pulses.

Figure 7:
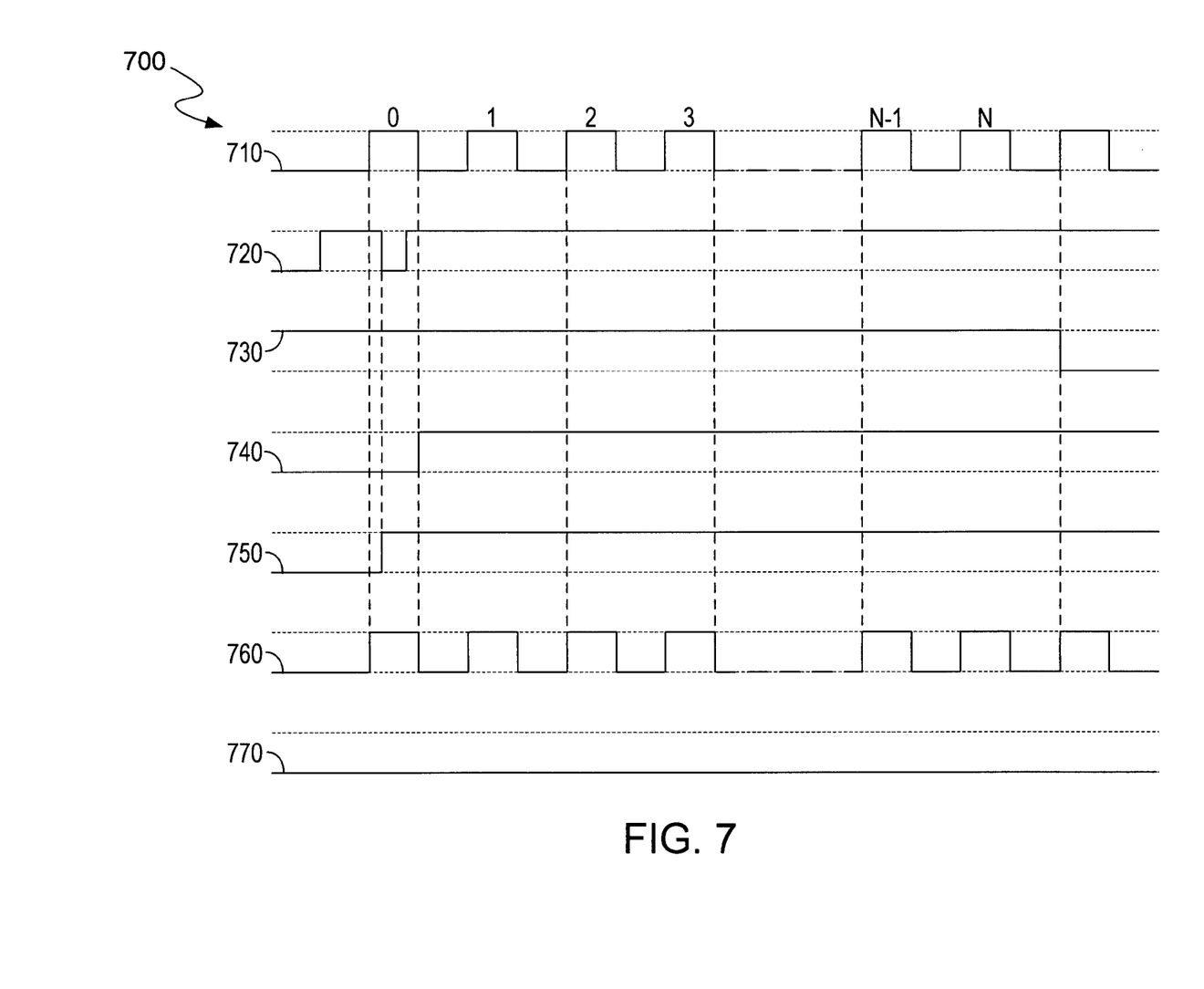
FIG. 7 illustrates signal waveforms at a READ mode of the trim signal translation unit consistent with the embodiment in FIG. 3.

FIG. 7 depicts waveforms 700 when the trim translation unit 500 is working in the READ mode. Waveforms 710, 720, 730, 740, 750, 760 and 770 illustrates the signal CLK, the signal DATA, the signal PROG, the signal RESETN, the signal CLK1, the signal CLK2 and the signal PW1, respectively. The waveforms at the first duty cycle, cycle 0 of the signal CLK 710 are for mode decision. During cycle 0, the signal CLK 710 is to logic 1 and the signal DATA 720 has a negative pulse, the trim translation unit 500 works in the READ mode. The signal PROG 730 is set to logic 1. The signal RESETN 740 is set to logic 1 at the falling edge of cycle 0 of the signal CLK 710. The signal CLK1 750 is set to logic 1 at the falling edge of the negative pulse of the signal DATA 720 during cycle 0. The signal CLK2 760 has a waveform same as the signal CLK 710. The signal PW1 660 is set to logic 0.

Figure 8:
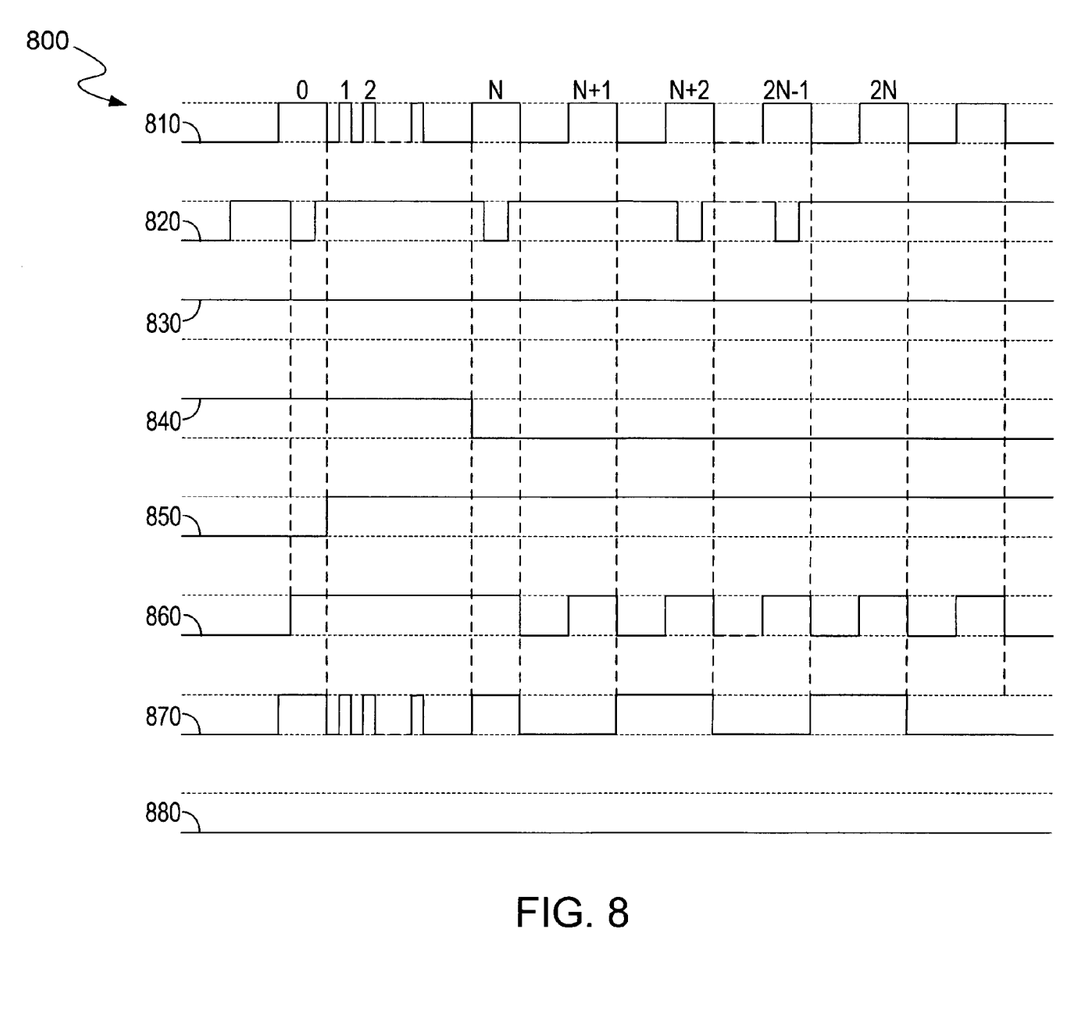
FIG. 8 illustrates signal waveforms at a QUSAI-ZAPPING mode of the trim signal translation unit consistent with the embodiment in FIG. 3.

FIG. 8 depicts waveforms 800 when the trim translation unit 500 is working in the READ mode and then working in the QUASI-ZAPPING mode. Waveforms 810, 820, 830, 840, 850, 860, 870, 880 illustrates the signal CLK, the signal DATA, the signal PROG, the signal PDB, the signal RESETN, the signal CLK1, the signal CLK2 and the signal PW1 respectively. When the READ mode ends at a cycle N of the signal CLK 810, the trim translation unit 500 enters the QUASI-ZAPPING mode automatically. In the QUASI-ZAPPING mode, the signal PDB 840 is set to logic 0. The signal CLK1 860 has a waveform same as the signal CLK 810 after the cycle N. The signal CLK2 870 is set to logic 1 for a duty cycle time period if the signal DATA has a negative pulse. The signal PW1 880 is set to logic 0.

Figure 9:
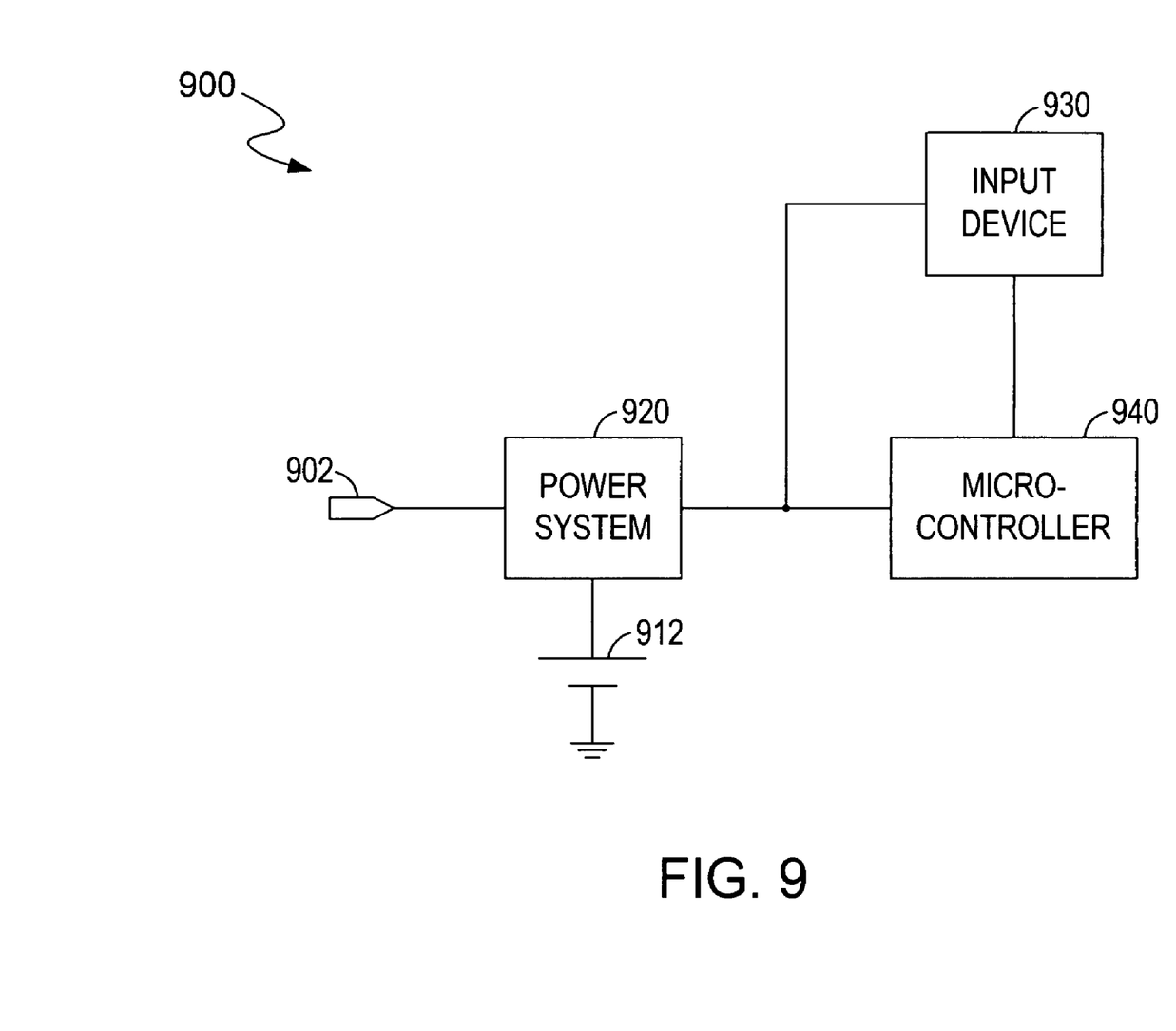
FIG. 9 is a block diagram of a portable computer utilizing the power system in FIGS. 1 and 2.

FIG. 9 depicts a portable computer 900 utilizing the power system 120 in FIG. 1. The portable computer 900 includes an input port 902, a power system 920, a rechargeable battery 912, an input device 930 and a microcontroller 940. The input port 902 is for connecting to an external power source such as an adapter. The power system 920 is an exemplary embodiment of the power system according to the present invention. The power system 920 is connected to the battery 912 to manage charging, discharging and protection functions of the battery 912. The input device 930 takes inputs from a user and provides the inputs to the microcontroller 940. The microcontroller 940 performs operations based on the inputs from the user.

If the adapter is coupled to the power system 920, then the power system 920 is working in a charging mode. The adapter supplies power to the portable computer 900. The adapter also charges the battery 912 under control of the power system 920. If the adapter is absent, then the power system 920 is working in a discharging mode. The battery 912 supplies power to the input device 930 and the micro controller 940. During the operating mode, including the charging mode and the discharging mode, the power system 920 monitors a temperature, a voltage and a current of the battery 912. If an abnormal condition occurs, such as the temperature is excessive high/low, the voltage is excessive high/low or the current is too high, the power system 920 will stop the operating mode to protect the portable computer 900.

In operation, the adapter is coupled to the power system 120. The power management unit 130 sets the terminal HDR as the pulse width modulation (PWM) signal. Then the circuit 100 is working in the charging mode. During the charging process, the power management unit 130 monitors the battery temperature, the battery current and the battery voltages through temperature detector 360, current detectors 320 and 350 and voltage detectors 330 and 340 respectively.

When the power system 120 is working in the charging mode, the power management unit 130 monitors the battery temperature to protect the power system 120 from charging the batteries 112 and 114 in an excessive high/low temperature. The voltage of the thermistor 122 is indicative of the battery temperature. The voltage is sensed by the power management unit 130. The temperature detector 360 compares the voltage with the predetermined voltage range. If the voltage of the thermistor 122 is within the predetermined voltage range, the temperature detector 360 applies a signal at logic 0 to the charge controller 306. If the voltage of the thermistor 122 is out of the predetermined voltage range, the temperature detector 360 applies a signal at logic 1 to the charge controller 306. Then the charge controller 306 set the terminal HDR to an OFF state to turn off the charge switch 150. Thus the charging mode is terminated to protect the power system 120.

If the power system 120 is working under a normal condition, the adapter charges the batteries 112 and 114 continuously. The voltage detectors 330 and 340 monitor the voltages of the batteries 112 and 114. If the battery 112 and/or 114 is charged to a predetermined value, the voltage detector 330 applies a signal to the protection controller 302. The protection controller 302 sends a signal to the charge controller 306 to set the terminal HDR to an OFF state. Then the charge switch 150 is turned off to terminate the charging process. During the charging process, the power management unit 130 also monitors the battery current. If the current exceeds a predetermined value, the charge controller 306 will set the terminal HDR to an OFF state to terminate the charging process.

If the adapter is absent, then the circuit 100 works in the discharging mode. The terminal DO is set to an ON state and the terminal HDR is set to an OFF state. The batteries 112 and 114 supply power to the system load through the switching circuit 145. During the discharging process, the power management unit 130 monitors the battery current and the battery voltages through current detectors 320 and 350 and voltage detectors 330 and 340 respectively. If an abnormal condition occurs, such as the current is higher than a predetermined value, the current detector 320 applies a signal at logic 1 to the protection controller 302. The protection controller 302 then set the terminal DO to an OFF state to switching off the switching circuit 145. Thus the discharging process is terminated.

The embodiments that have been described herein, however, are but some of the several that utilize this invention and are set forth here by way of illustration but not of limitation.

It is obvious that many other embodiments, which will be readily apparent to those skilled in the art, may be made without departing materially from the spirit and scope of the invention as defined in the appended claims. Furthermore, although elements of the invention may be described or claimed in the singular, the plural is contemplated unless limitation to the singular is explicitly stated.

What is claimed is:

1. A power system coupled to at least one battery, comprising:
   a switching circuit coupled to the at least one battery;
   a sensing circuit for sensing a temperature of the at least one battery and generating a signal based on the temperature; and
   a power management unit being capable of monitoring a voltage and a current of the at least one battery, receiving the signal from the sensing circuit and switching off the switching circuit when an abnormal condition is sensed by the power management unit,
   wherein the power management unit further comprising a reference voltage generator, the reference voltage generator comprises:
      a trim translation unit receiving a voltage from an external source and generating a plurality of signals, wherein the trim translation unit further comprises:
         a first flip-flop receiving a voltage of the external source and outputting a signal;
         a second flip-flop receiving the signal from the first flip-flop and generating a signal of the plurality of signals;
         a third flip-flop receiving the signal from the first flip-flop and outputting a signal;
         a selector receiving the signal from the third flip-flop and generating a signal of the plurality of signals;
         a fourth flip-flop receiving a control signal and generating a signal of the plurality of signals;
         a fifth flip-flop receiving the signal from the fourth flip-flop and outputting a signal; and
         a sixth flip-flop receiving the signal from the fifth flip-flop and generating a signal of the plurality of signals.

2. The power system of claim 1, wherein the power management unit further comprising:
   a temperature detector for receiving the signal from the sensing circuit and generating a signal based on the signal from the sensing circuit;
   a protection controller capable of monitoring the voltage and the current of the at least one battery and generating a signal capable of switching off the switching circuit when the abnormal condition is sensed by the power management unit; and
   a charge controller capable of monitoring the voltage and the current of the at least one battery and receiving the signal from the temperature detector, and generating a signal capable of switching off the switching circuit when the abnormal condition is sensed by the power management unit.

3. The power system of claim 2, wherein the switching circuit further comprising:
   a first switch coupled to the at least one battery; and
   a second switch coupled to the first switch,
   wherein the first switch can be switched off by thee signal form the charge controller and the second switch can be switched off by the signal from the protection controller.

4. The power system of claim 2, wherein the switching circuit further comprising:
   a first switch coupled to the at least one battery; and
   a second switch coupled to the first switch,
   wherein the first switch can be switched off by the signal from the protection controller and the second switch can be switched off by the signal from the charge controller.

5. The power system of claim 2, wherein the power management unit further comprising a power unit for coupling to an external source, the power unit generating a signal indicative of presence or absence of the external source to the protection controller and the charge controller.

6. The power system of claim 1, wherein the abnormal conditions further comprising a voltage out of a predetermined voltage range, a current larger than a predetermined value and a temperature out of a predetermined temperature range.

7. A portable computer comprising:
   an input device for taking inputs from a user;
   a microcontroller for performing operations based on the inputs from the user;
   at least one battery for powering the portable computer; and
   a power system for managing the at least one battery, the power system comprising:
      a switching circuit coupled to at least one battery;
      a sensing circuit for sensing a temperature of the at least one battery and generating a signal according to the temperature; and
      a power management unit being capable of monitoring a voltage and a current of the at least one battery, receiving the signal from the sensing circuit and switching off the switching circuit when an abnormal condition is sensed by the power management unit,
      wherein the power management unit further comprising a reference voltage generator, the reference voltage generator comprises:
         a trim translation unit receiving a voltage from an external source and generating a plurality of signals, wherein the trim translation unit further comprises:
            a first flip-flop receiving a voltage of the external source and outputting a signal;
            a second flip-flop receiving the signal from the first flip-flop and generating a signal of the plurality of signals;
            a third flip-flop receiving the signal from the first flip-flop and outputting a signal;
            a selector receiving the signal from the third flip-flop and generating a signal of the plurality of signals;
            a fourth flip-flop receiving a control signal and generating a signal of the plurality of signals;
            a fifth flip-flop receiving the signal from the fourth flip-flop and outputting a signal; and
            a sixth flip-flop receiving the signal from the fifth flip-flop and generating a signal of the plurality of signals.

8. The portable computer of claim 7, wherein the power management unit further comprising:
   a temperature detector for receiving the signal from the sensing circuit and generating a signal reflecting the temperature of the at least one battery;
   a protection controller capable of monitoring the voltage and the current of the at least one battery and generating a signal capable of switching off the switching circuit when the abnormal condition is sensed by the power management unit; and
   a charge controller capable of monitoring the voltage and the current of the at least one battery and receiving the signal from the temperature detector, and generating a signal capable of switching off the switching circuit when the abnormal condition is sensed by the power management unit.

9. The portable computer of claim 8, wherein the switching circuit further comprising:
   a first switch; and
   a second switch coupled to the first switch,
   wherein the first switch can be switched off by the signal form the protection controller and the second switch can be switched off by the signal from the charge controller.

* * * * *